US010578198B2

(12) United States Patent
Drennen et al.

(10) Patent No.: US 10,578,198 B2
(45) Date of Patent: Mar. 3, 2020

(54) BALL SCREW ASSEMBLY FOR AIRCRAFT BRAKE

(71) Applicant: GOODRICH CORPORATION, Charlotte, NC (US)

(72) Inventors: David Drennen, Bellbrook, OH (US); Kevin Rehfus, Troy, OH (US); Satinder Mann, Vandalia, OH (US); Robert French, Beavercreek, OH (US); Harald Klode, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 148 days.

(21) Appl. No.: 15/709,149

(22) Filed: Sep. 19, 2017

(65) Prior Publication Data

US 2018/0031094 A1 Feb. 1, 2018

Related U.S. Application Data

(62) Division of application No. 14/528,816, filed on Oct. 30, 2014, now Pat. No. 9,791,025.

(51) Int. Cl.
*F16H 25/22* (2006.01)
*F16D 65/18* (2006.01)
(Continued)

(52) U.S. Cl.
CPC ........ *F16H 25/2204* (2013.01); *B60T 13/741* (2013.01); *F16D 65/18* (2013.01); *B64C 25/44* (2013.01); *F16D 2121/24* (2013.01); *F16D 2125/40* (2013.01); *F16D 2125/50* (2013.01); *F16H 2025/2075* (2013.01)

(58) Field of Classification Search
CPC ......... F16H 25/2204; F16H 2025/2075; F16D 65/18; F16D 2125/50; F16D 2121/24; F16D 2125/40; B60T 13/741; B64C 25/44
See application file for complete search history.

(56) References Cited

U.S. PATENT DOCUMENTS

| 3,951,470 A | 4/1976 | McLean |
| 4,542,809 A | 9/1985 | Crossman |

(Continued)

FOREIGN PATENT DOCUMENTS

| JP | 2009127737 | 6/2009 |
| WO | 0138750 | 5/2001 |

OTHER PUBLICATIONS

Extended European Search Report dated May 2, 2016 in European Application No. 15192081.6.
(Continued)

*Primary Examiner* — Christopher J Besler
*Assistant Examiner* — Christine Pellazar Bersabal
(74) *Attorney, Agent, or Firm* — Snell & Wilmer, L.L.P.

(57) ABSTRACT

A mechanical linear actuator in an aircraft brake may include a ball nut, a ball screw, and an actuator drive unit housing. The ball screw may rotate to drive the ball nut axially. The ball screw and the actuator drive unit housing may form a series of annular raceways. The ball screw may have a first window corresponding to a first raceway and a second window corresponding to a second raceway. Balls may be inserted into the first raceway through the first window and into the second raceway through the second window.

6 Claims, 5 Drawing Sheets

(51) Int. Cl.
  *B60T 13/74* (2006.01)
  *F16H 25/20* (2006.01)
  *F16D 125/40* (2012.01)
  *F16D 125/50* (2012.01)
  *B64C 25/44* (2006.01)
  *F16D 121/24* (2012.01)

(56) References Cited

U.S. PATENT DOCUMENTS

| | | |
|---|---|---|
| 6,325,182 B1 | 12/2001 | Yamaguchi |
| 6,389,915 B1 | 5/2002 | Wngett |
| 2005/0077782 A1 | 4/2005 | Horiuchi et al. |
| 2010/0275710 A1 | 11/2010 | Wingett |
| 2012/0180588 A1* | 7/2012 | Klode ................ F16D 65/16 |
| | | 74/424.82 |
| 2016/0123445 A1 | 5/2016 | Drennen |

OTHER PUBLICATIONS

USPTO; Restriction Requirement Office Action dated Sep. 23, 2016 in U.S. Appl. No. 14/528,816.
USPTO; Pre-Interview Communication Office Action dated Feb. 24, 2017 in U.S. Appl. No. 14/528,816.
USPTO; Notice of Allowance dated Jun. 19, 2017 in U.S. Appl. No. 14/528,816.

\* cited by examiner

BALL SCREW ASSEMBLY FOR AIRCRAFT BRAKE

CROSS-REFERENCE TO RELATED APPLICATION

This application is a divisional of, claims priority to and the benefit of, U.S. Ser. No. 14/528,816 filed Oct. 30, 2014 and entitled "BALL SCREW ASSEMBLY FOR AIRCRAFT BRAKE," which is hereby incorporated by reference in its entirety.

FIELD

The present disclosure relates to aircraft brake systems, and more particularly, to mechanical linear actuators.

BACKGROUND

A mechanical linear actuator for an aircraft brake assembly often incorporates a ball screw that transmits axial load from a ball nut, through balls, and to a rotating screw. The axial load from the rotating screw is then transmitted out of the assembly through the use of a thrust bearing to reduce rotary friction torque. The thrust bearing may be an annular ring of balls between the ball screw and an actuator drive unit housing. The balls may be inserted into the annular ring via a window in the ball screw. However, the window may weaken the surrounding area in the ball screw and may result in damage to the ball screw.

SUMMARY

In various embodiments, a mechanical linear actuator may comprise an actuator drive unit ("ADU") housing and a ball screw. The ADU housing may comprise a first ADU annular track and a second ADU annular track. The ball screw may comprise a first ball screw annular track, wherein the first ADU track and the first ball screw annular track form a first annular raceway. The ball screw may comprise a second ball screw annular track, wherein the second ADU annular track and the second ball screw annular track form a second annular raceway. The ball screw may comprise a third ball screw annular track, wherein a third ADU annular track and the third ball screw annular track form a third annular raceway. The ball screw may comprise a first window corresponding to the first annular raceway and a second window corresponding to the second annular raceway.

In various embodiments, a method of assembling a mechanical linear actuator may comprise inserting an ADU housing within a ball screw. A series of ball screw annular tracks and a series of ADU housing annular tracks may form a first annular raceway and a second annular raceway. A first window in the ball screw may be aligned with the first annular raceway. A second or third window in the ball screw may be aligned with the second annular raceway. A first plurality of balls may be inserted through the first window. A second plurality of balls may be inserted through the second window.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, an aircraft brake system may comprise a mechanical linear actuator. The mechanical linear actuator may comprise a ball screw and a ball nut piston. The ball screw may rotate in order to drive the ball nut piston in an axial direction. A puck coupled to the ball nut piston may contact a brake stack. The contact with the brake stack may exert an axial load through the ball nut piston to the ball screw. This axial load may be transferred through the ball screw to an ADU housing via a thrust bearing. The thrust bearing may comprise a series of parallel, annular tracks between the ball screw and the ADU housing. Multiple rows of balls in the thrust bearing may increase the load rating. The balls may be inserted into the annular tracks via multiple windows in the ball screw. The multiple windows may distribute weaknesses in the ball screw caused by the removal of material for the windows.

Figure 1:
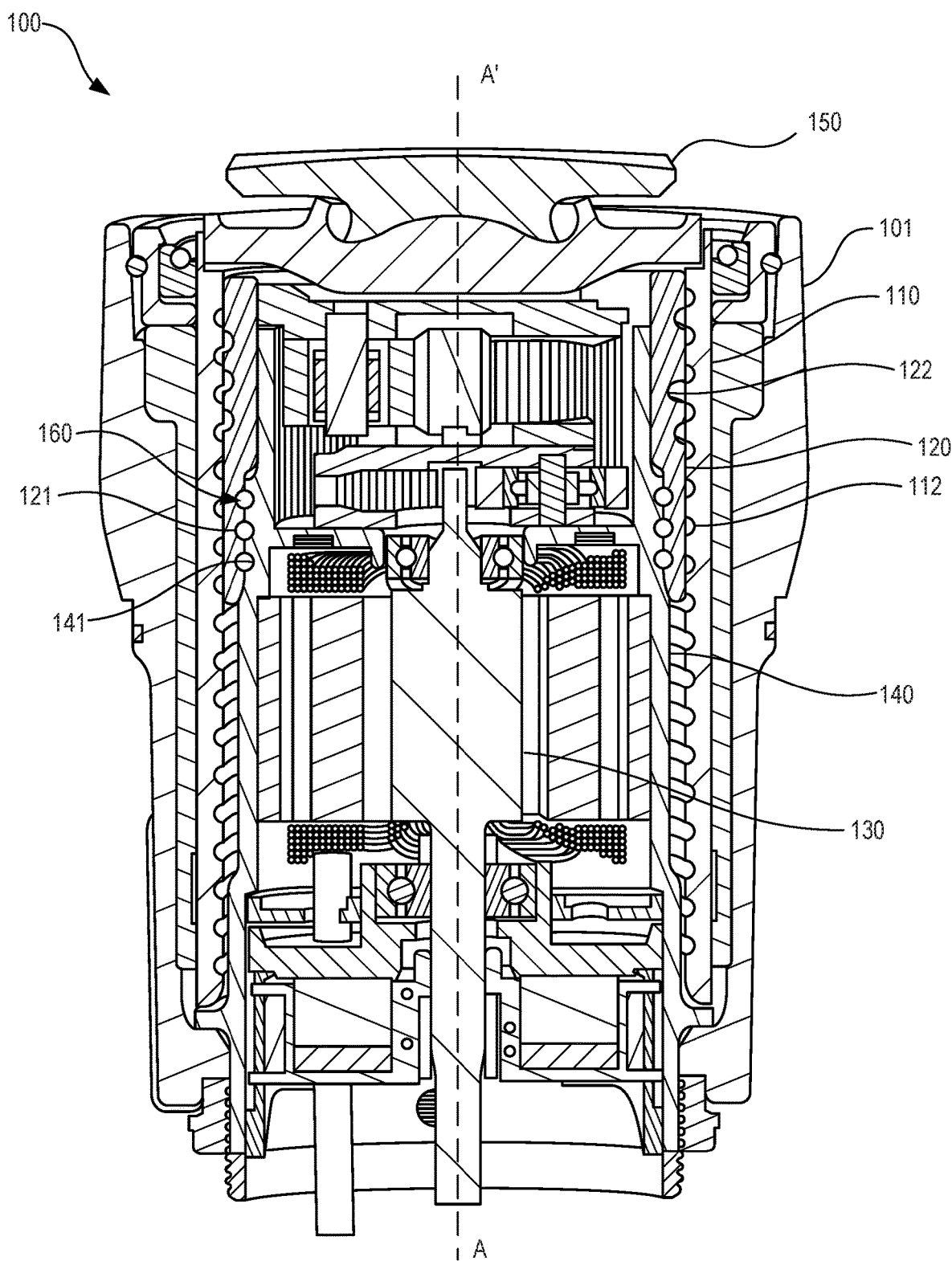
FIG. 1 illustrates a section view of mechanical linear actuator ("MLA"), in accordance with various embodiments.

Referring to FIG. 1, a section view of a mechanical linear actuator ("MLA") 100 is illustrated according to various embodiments. The MLA 100 may extend along the axis marked A-A', with A being located near a distal portion of MLA 100 and A' being near a proximal portion of MLA 100. The MLA 100 may, as described above, be involved in the application of a braking force to an aircraft wheel. The MLA 100 assembly may comprise an MLA housing 101, which may extend along the axis A-A'. The MLA housing 101 may house a variety of components, including, for example, a ball nut piston 110, a ball screw 120, and an actuator drive unit ("ADU") 130. The ADU 130 may be located within an ADU housing 140. Generally, the ADU 130 may rotate and may drive the ball screw 120 through a plurality of rotations.

The ball screw 120 may comprise a series of cross-under ball tracks 122. The ball nut piston 110 may comprise a helical track 112. A plurality of balls may be located within the cross-under ball tracks 122. The balls may be metal spheres which decrease friction and transfer loads between adjacent components. As the ball screw 120 rotates, the ball nut piston 110 may translate distally and/or proximally along the axis A-A' (depending upon the direction of rotation of the ball screw 120). The ball nut piston 110 may be coupled to a disc or "puck," 150 at a distal end thereof. The puck 150 may exert a pressure against a brake stack coupled to an aircraft wheel to impede or halt rotation of the wheel. The pressure may be transferred back through the puck 150, to the ball nut piston 110, to the ball screw 120, and to the ADU housing 140. A series of parallel ball screw annular tracks 121 and a series of annular ADU housing annular tracks 141 may form a series of annular raceways 160. Balls in the series of parallel annular raceways 160 between the ball screw 120 and the ADU housing 140 may distribute the load applied on the ADU housing 140 from the ball screw 120.

Figure 2:
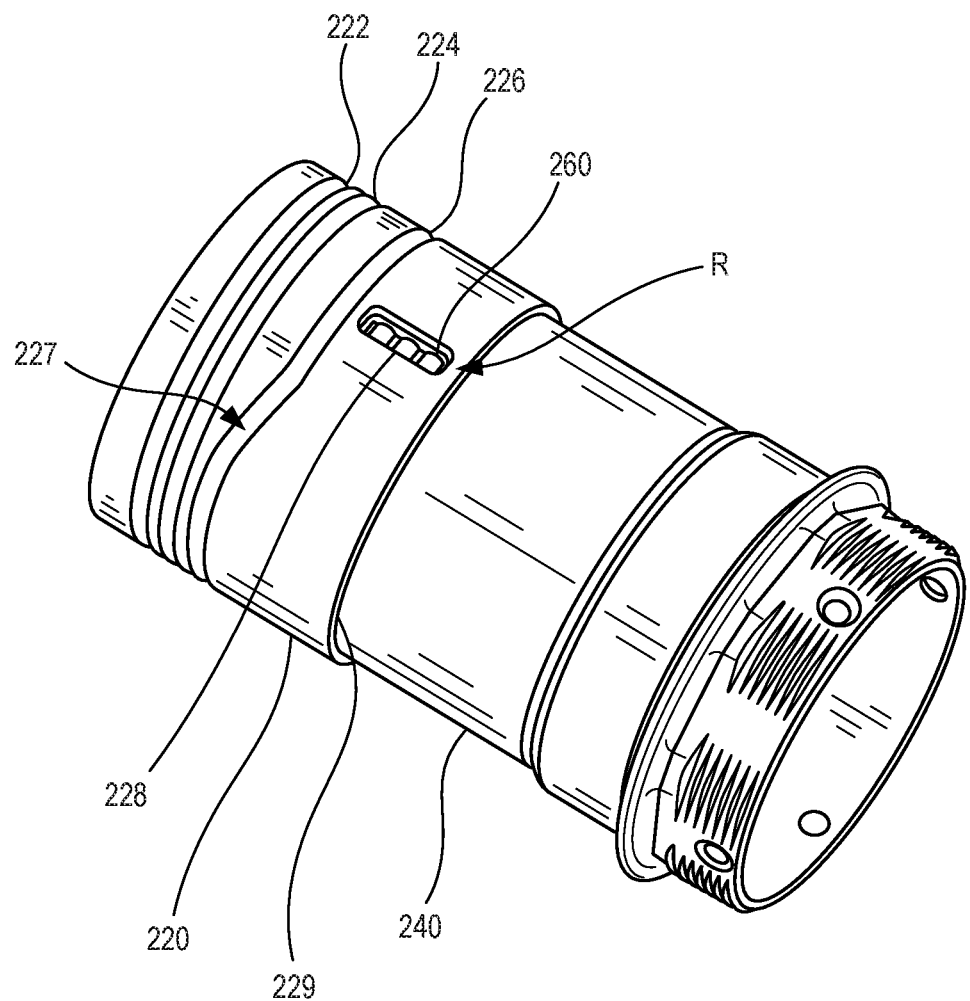
FIG. 2 illustrates a perspective view of a ball screw and an ADU housing, in accordance with various embodiments.

Referring to FIG. 2, a perspective view of a ball screw 220 and an ADU housing 240 is illustrated according to various embodiments. The ball screw 220 may comprise three cross-under ball tracks 222, 224, 226. The three cross-under ball tracks 222, 224, 226 are independent (i.e. balls in cross-under ball track 222 do not enter cross-under ball tracks 224, 226). Each cross-under ball track 222, 224, 226 may comprise a cross-under portion. The cross-under portion 227 is shown for cross-under ball track 226. At the cross-under portion 227, a depth of the cross-under ball track 226 may be greater than the remaining portion of the cross-under ball track 226, allowing balls to move under the threads of a ball nut piston.

The ball screw 220 may comprise a window 228. The window 228 may allow balls to be inserted into the annular raceways 260. Once the balls have been inserted through the window 228, a plug may be inserted in the window 228 to prevent the balls from falling out through the window 228. The window 228 may extend axially across all three annular raceways 260 in order to allow balls to be inserted into each annular raceway 260. However, the window 228 may remove material from the ball screw 220, which may decrease the strength of the ball screw 220. In particular, region R, located between the window 228 and the proximal edge 229 of the ball screw 220 may be susceptible to high cycle fatigue due to concentrated loading in this area.

Figure 3:
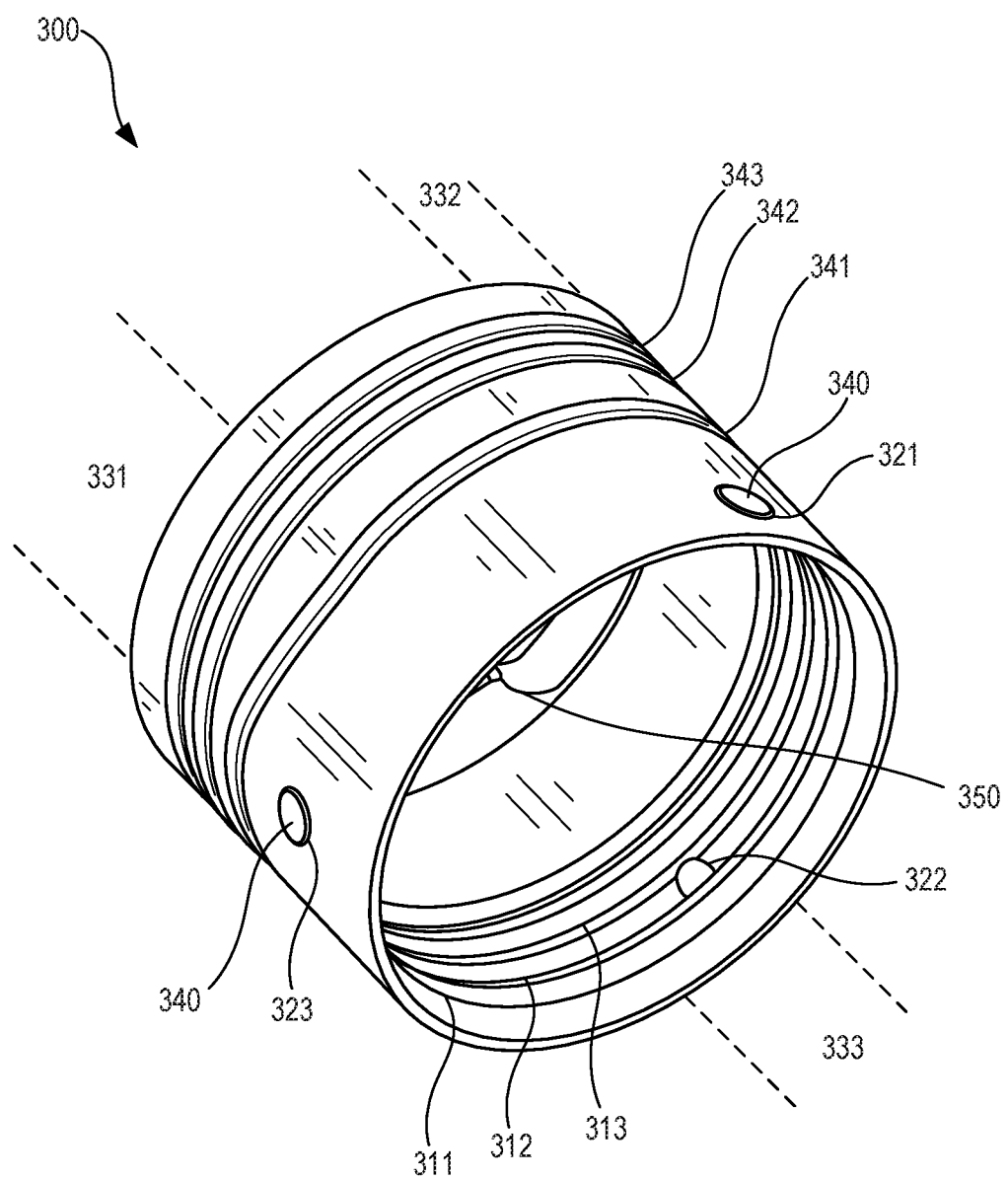
FIG. 3 illustrates a perspective view of a ball screw, in accordance with various embodiments.

Referring to FIG. 3, a perspective view of a ball screw 300 having multiple windows is illustrated according to various embodiments. The ball screw 300 may comprise a first annular track 311, a second annular track 312, and a third annular track 313. In various embodiments, the ball screw 300 may comprise any number of annular tracks. The ball screw 300 may comprise a plurality of balls in the annular tracks 311, 312, 313 which transfer load from the ball screw 300 to an ADU housing. The ball screw 300 may comprise one or more ball screw alignment tabs 350 which align with a gear train and ADU housing which may be inserted within the ball screw 300.

The ball screw 300 may comprise a window for each annular track. The ball screw 300 may comprise a first window 321 corresponding to the first annular track 311, a second window 322 corresponding to the second annular track 312, and a third window 323 corresponding to the third annular track 313. Balls may be inserted through the first window 321 to fill the first annular track 311, through the second window 322 to fill the second annular track 312, and through the third window 323 to fill the third annular track 313. The first window 321, the second window 322, and the third window 323 may individually be smaller than a window which spans across all annular tracks 311, 312, 313. Thus, the amount of material removed in the area of each window 321, 322, 323 may be less, and the stress concentration may be decreased as compared to a single larger window. A plug 340 may be inserted into each window 321, 322, 323 in order to prevent the balls from falling out through the windows 321, 322, 323.

In various embodiments, the windows 321, 322, 323 may be equally spaced around the circumference of the ball screw 300. For example, the first window 321 may be separated from the second window 322 by 120° and the second window 322 may be separated from the third window 323 by 120°, and the third window 323 may be separated from the first window 321 by 120°. Similarly, in an embodiment with two windows, a first window may be separated from a second window by 180°.

In various embodiments, each window 321, 322, 323 may be located within a cross-under segment. A cross-under segment is the circumferential segment of the ball screw 300 in which balls may cross under tracks in a ball nut piston. For example, the ball screw 300 comprises a first cross-under segment 331 where balls in a first cross-under track 341 may cross under threads in a ball nut piston, a second cross-under segment 332 where balls in a second cross-under track 342 may cross under threads in a ball nut piston, and a third cross-under segment 333 where balls in a third cross-under track 343 may cross under balls in a ball nut piston. In the cross-under segments, one of the cross-under tracks may not be receiving a load from the ball nut piston. Thus, the stress around the windows 321, 322, 323 may be decreased in the cross-under segments.

Figure 4:
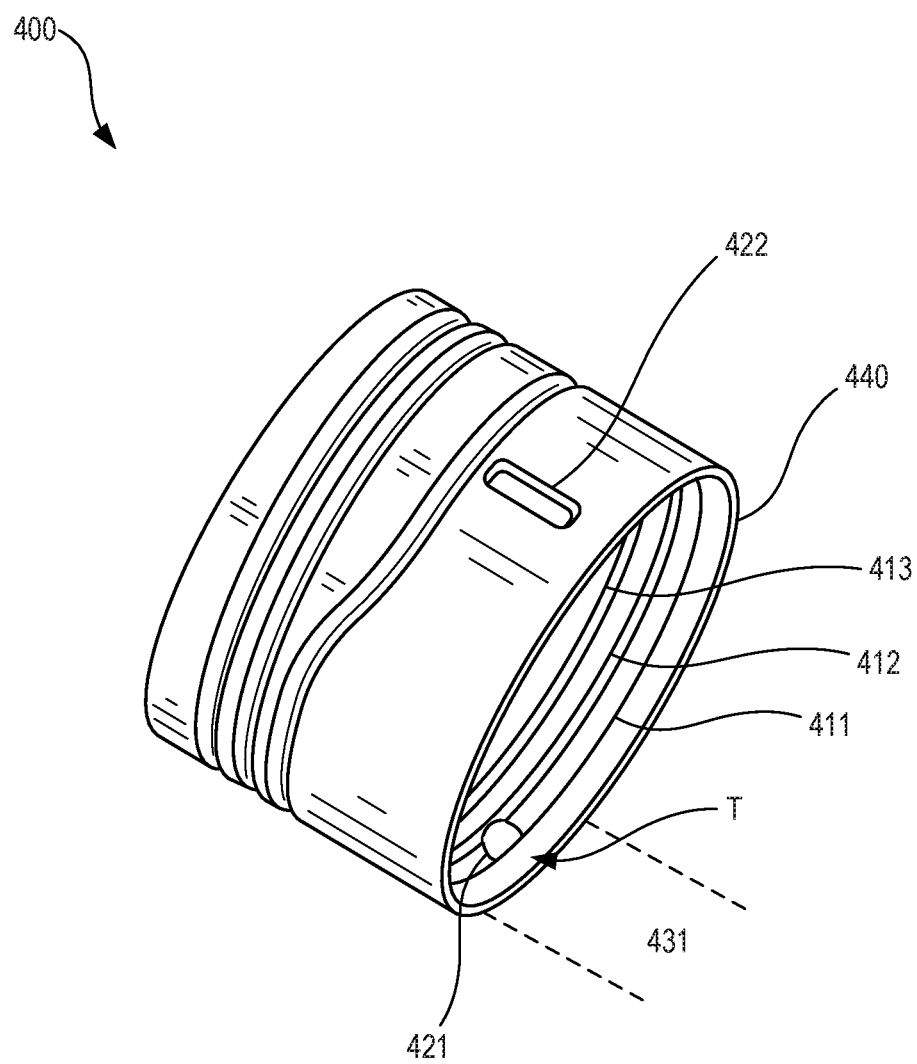
FIG. 4 illustrates a perspective view of a ball screw with two windows, in accordance with various embodiments.

Referring to FIG. 4, a perspective view of a ball screw 400 having three annular tracks and two windows is illustrated according to various embodiments. A first window 421 may correspond to a first annular track 411 closest to a proximal end 440 of the ball screw 400. A second window 422 may correspond to a second annular track 412 and a third annular track 413. The highest stress location may be located in region T located between the first window 421 and the proximal end 440 due to the small amount of material in region T. Thus, the first window 421 may be located in a cross-under segment 431. However, the first window 421 and the second window 422 may be equally separated around the circumference of the ball screw 400. The first window 421 and the second window 422 may be separated by 180°. Thus, in various embodiments the second window 422 is not located in a cross-under segment.

Figure 5:
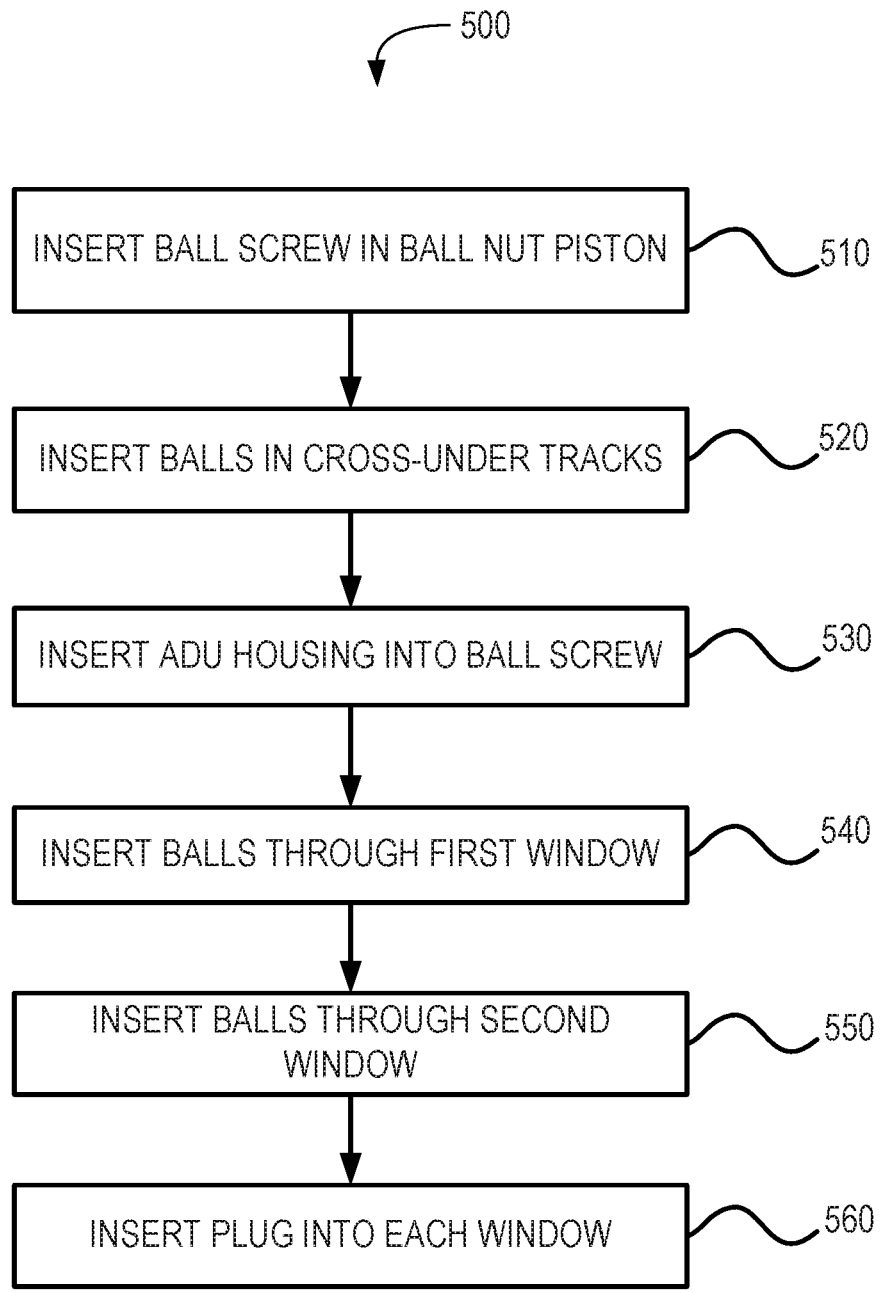
FIG. 5 illustrates a flow chart of a process for assembling a ball screw assembly, in accordance with various embodiments.

Referring to FIG. 5, a flow chart 500 of a method for assembling a ball screw assembly is illustrated according to various embodiments. A ball screw may be inserted into a ball nut piston (step 510). A plurality of balls may be inserted into cross-under tracks in the ball screw (step 520). A motor and gear train may be inserted into an ADU housing. A retainer may be disposed around the ADU housing. The ADU housing and gear train may then be inserted into the ball screw (step 530). The ADU housing and gear train may be aligned with ball screw alignment tabs in the ball screw. The alignment with the ball screw tabs may cause a series of annular tracks in the ball screw to be aligned with a series of annular tracks in the ADU housing to form a series of annular raceways. A first window in the ball screw may be aligned with a first annular track in the ADU housing, and a second window in the ball screw may be aligned with a second annular track in the ADU housing. A plurality of balls may be inserted through the first window into the first annular track (step 540). A plurality of balls may be inserted through the second window into the second annular track (step 550). In various embodiments, a plurality of balls may be inserted through the second window into a third annular track. However, in various embodiments, a plurality of balls may be inserted through a third window into the third annular track. A plug may be inserted into each window (step 560). The plugs may prevent the balls from falling out through the windows. The retainer may be slid around the plugs to retain the plugs in place.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of assembling a mechanical linear actuator ("MLA") comprising:
   inserting an ADU housing within a ball screw, such that a series of ball screw annular tracks and a series of ADU housing annular tracks form a first annular raceway and a second annular raceway;
   aligning a first window in the ball screw with the first annular raceway and a second window in the ball screw with the second annular raceway;
   inserting a first plurality of balls through the first window; and
   inserting a second plurality of balls through the second window,
   wherein the ball screw comprises a first cross-under segment corresponding to the first annular raceway and a second cross-under segment corresponding to the second annular raceway,
   wherein the first window is in the first-cross under segment and the second window is in the second cross-under segment,
   wherein the first plurality of balls are disposed in the first cross under segment and cross under a thread of a ball nut piston via a cross-under portion of the first cross under segment and wherein the first plurality of balls break contact with the thread of the ball nut piston within the cross-under portion.

2. The method of claim 1, further comprising inserting a first plug into the first window and a second plug into the second window.

3. The method of claim 1, further comprising aligning the ADU housing with a ball screw alignment tab.

4. The method of claim 1, further comprising inserting the ball screw within a ball nut piston.

5. The method of claim 1, further comprising inserting a third plurality of balls through a third window in the ball screw.

6. The method of claim 4, further comprising inserting a third plurality of balls into a cross-under track in the ball screw.

* * * * *